R. S. MUNGER.

Cotton-Gin Saw-Cleaner.

No. 8,721. Reissued May 20, 1879.

WITNESSES:

C. Neveux

C. Sedgwick

INVENTOR:

R. S. Munger

BY Munn & Co

ATTORNEYS.

N. PETERS, PHOTO-LITHOGRAPHER, WASHINGTON, D. C.

UNITED STATES PATENT OFFICE.

ROBERT S. MUNGER, OF MEXIA, TEXAS.

IMPROVEMENT IN COTTON-GIN-SAW CLEANERS.

Specification forming part of Letters Patent No. 202,744, dated April 23, 1878; Reissue No. 8,721, dated May 20, 1879; application filed September 7, 1878.

*To all whom it may concern:*

Be it known that I, ROBERT S. MUNGER, of Mexia, in the county of Limestone and State of Texas, have invented a new and Improved Cotton-Gin-Saw Cleaner, of which the following is a specification.

Figure 2:
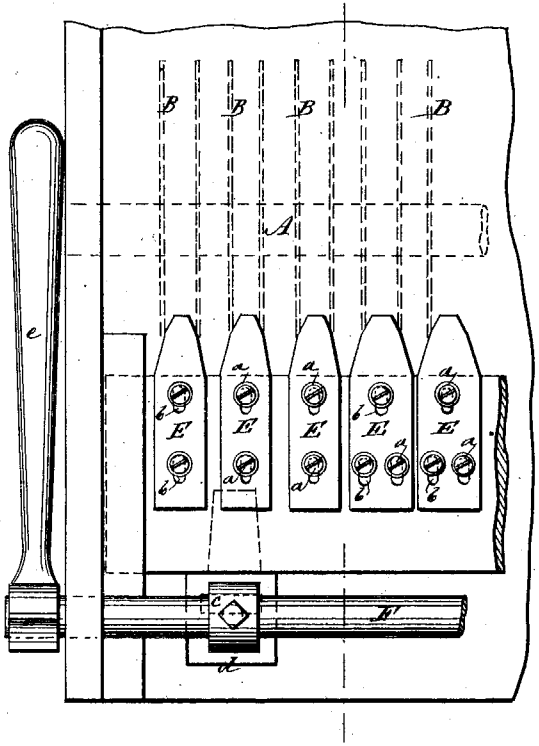
Figure 1:
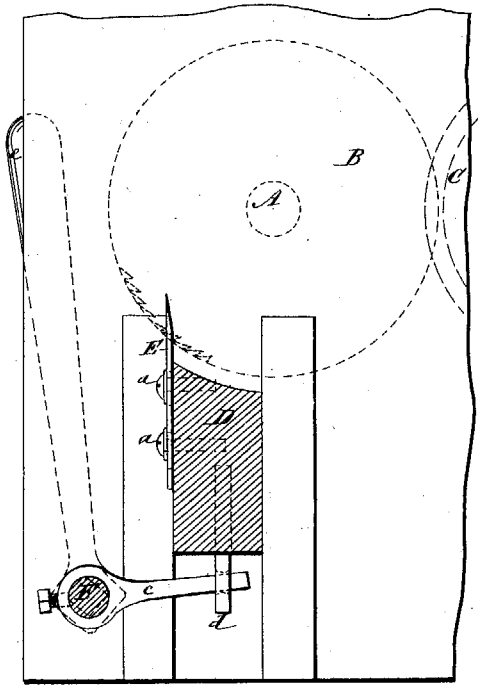

Figure 1 is a side elevation, in section, of my improved gin-saw cleaner. Fig. 2 is a detail face view of the saw-cleaning knives.

Similar letters of reference indicate corresponding parts.

The object of my invention is to provide a device for quickly cleaning the saws of cotton-gins when they become gummed.

It consists in a series of knives that are supported by a movable bar or frame, and may be thrust between the saws when the same are to be cleaned.

Referring to the drawings, A is the shaft, upon which are placed gin-saws B. C are the cleaning-brushes, arranged in the usual relation to the saws, all of which parts are shown in dotted lines.

D is a knife-support, which consists of a bar or frame arranged parallel with the saw-shaft, and placed in guides in the gin-saw frame, so as to be adjustable to or from the gin-saws. To this knife-support are secured, by screws *a*, a series of tapering knives, E, the said knives being slotted at the places where the screws pass through, to permit them to be individually adjusted.

The knives are placed apart a suitable distance to receive between each pair two gin-saws.

A rock-shaft, F, is journaled in the gin-saw frame parallel to the knife-support D and saw-shaft A. To this rock-shaft are attached arms *c*, which extend through eyes *d*, that project from the knife-support D; and the said shaft is provided with a lever, *e*, at one of its ends, by which it may be turned to move the knife-support to or from the saws, as may be required.

The knives E are sharpened from the under side, and are tapered so that they will readily enter between the saws.

The operation of cleaning the gin-saws is as follows: When the saws become gummed from ginning damp cotton the gin is stopped, and the knives E are thrown into contact with the saws by means of the rock-shaft F. The saws are then turned backward through one revolution.

The gummy cotton, by contact with the knives, is cut from one side of the saws, and drops of its own weight or is removed by the cleaning-brushes C.

Although a single set of knives acting on one side of the saws is sufficient to accomplish the cleaning of the saws, two sets may be employed, one set alternating with the other.

The knives may be readily removed and sharpened.

The advantages claimed for my improvement are that the same may be cleaned in a minute by one man at a single operation, whereas by the old method it requires several men and one and a half or two hours.

Having thus described my invention, what I claim as new is—

1. The tapering knives E, adjustably attached to the movable support D, arranged in guides in the gin-frame, substantially as and for the purpose specified.

2. The combination of the rock-shaft F, having arms *c* and the operating-lever *e*, with the knife-support D, substantially as shown and described.

ROBERT S. MUNGER.

Witnesses:
S. S. WALKER,
H. M. MUNGER.